(12) United States Patent
Gupta et al.

(10) Patent No.: US 9,146,798 B2
(45) Date of Patent: Sep. 29, 2015

(54) SYSTEM AND METHOD OF PERFORMING A HEALTH CHECK ON A PROCESS INTEGRATION COMPONENT

(71) Applicants: Vikas Gupta, Jaipur (IN); Aby Jose, Kerala (IN)

(72) Inventors: Vikas Gupta, Jaipur (IN); Aby Jose, Kerala (IN)

(73) Assignee: SAP SE, Walldorf (DE)

(*) Notice: Subject to any disclaimer, the term of this patent is extended or adjusted under 35 U.S.C. 154(b) by 185 days.

(21) Appl. No.: 13/801,849

(22) Filed: Mar. 13, 2013

(65) Prior Publication Data

US 2014/0281720 A1  Sep. 18, 2014

(51) Int. Cl.
*G06F 11/00* (2006.01)
*G06F 11/07* (2006.01)
*G06F 11/30* (2006.01)

(52) U.S. Cl.
CPC ........ *G06F 11/0748* (2013.01); *G06F 11/3051* (2013.01); *G06F 11/0709* (2013.01); *G06F 11/3006* (2013.01)

(58) Field of Classification Search
CPC . G06F 11/30; G06F 11/3003; G06F 11/3006; G06F 11/302; G06F 11/3051
USPC ............ 705/7.11, 7.12, 7.13, 7.15; 714/47.1; 709/223
See application file for complete search history.

(56) References Cited

U.S. PATENT DOCUMENTS

| | | | |
|---|---|---|---|
| 7,607,040 B2 * | 10/2009 | Barlow et al. | 714/10 |
| 7,787,388 B2 * | 8/2010 | Curtis et al. | 370/249 |
| 7,865,606 B1 * | 1/2011 | Tewes et al. | 709/230 |
| 7,930,681 B2 * | 4/2011 | Kloeffer et al. | 717/120 |
| 7,954,014 B2 * | 5/2011 | Wang et al. | 714/47.1 |
| 8,015,039 B2 * | 9/2011 | Brunswig et al. | 705/7.11 |
| 8,060,864 B1 * | 11/2011 | Michelsen | 717/126 |
| 2003/0202088 A1 * | 10/2003 | Knight | 348/14.08 |
| 2008/0319808 A1 * | 12/2008 | Wofford et al. | 705/6 |
| 2009/0106605 A1 * | 4/2009 | Kuchibhotla et al. | 714/47 |
| 2009/0265139 A1 * | 10/2009 | Klein et al. | 702/183 |
| 2010/0043004 A1 * | 2/2010 | Tambi et al. | 718/103 |
| 2012/0054334 A1 * | 3/2012 | Befort | 709/224 |
| 2013/0247136 A1 * | 9/2013 | Chieu et al. | 726/1 |

* cited by examiner

*Primary Examiner* — Joseph Kudirka
(74) *Attorney, Agent, or Firm* — Schwegman Lundberg & Woessner, P.A.

(57) ABSTRACT

In an example embodiment, a method of performing a health check on a process integration (PI) component is provided. A PI health check scenario is loaded into the PI component, the PI health check scenario including a reference to a list of checks. The PI health check scenario is then executed using the PI component, causing one or more checks in the list of checks to be performed at a predetermined frequency. The system can then automatically determine if one or more of the one or more checks fail.

18 Claims, 11 Drawing Sheets

SYSTEM AND METHOD OF PERFORMING A HEALTH CHECK ON A PROCESS INTEGRATION COMPONENT

TECHNICAL FIELD

This document generally relates to systems and methods for use with process integration components. More specifically, this document relates methods and systems for performing a health check on a process integration component.

BACKGROUND

Enterprise resource planning (ERP) systems allow for the integration of internal and external management information across an entire organization, including financial/accounting, manufacturing, sales and service, customer relationship management, and the like. The purpose of ERP is to facilitate the flow of information between business functions inside the organization and management connections to outside entities. One commonly used component in an ERP system is a process integration (PI) component. The PI component coordinates how various process components exchange data with one another.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

While the following description will describe various embodiments related to an enterprise resource planning (ERP) system, one of ordinary skill in the art will recognize that the claims should not be limited to merely ERP embodiments, as the solution described herein could apply to other systems such as Customer Relationship Management (CRM) systems, Supplier Relationship Management systems (SRM), or any other system having a process integration (PI) component.

Figure 1:
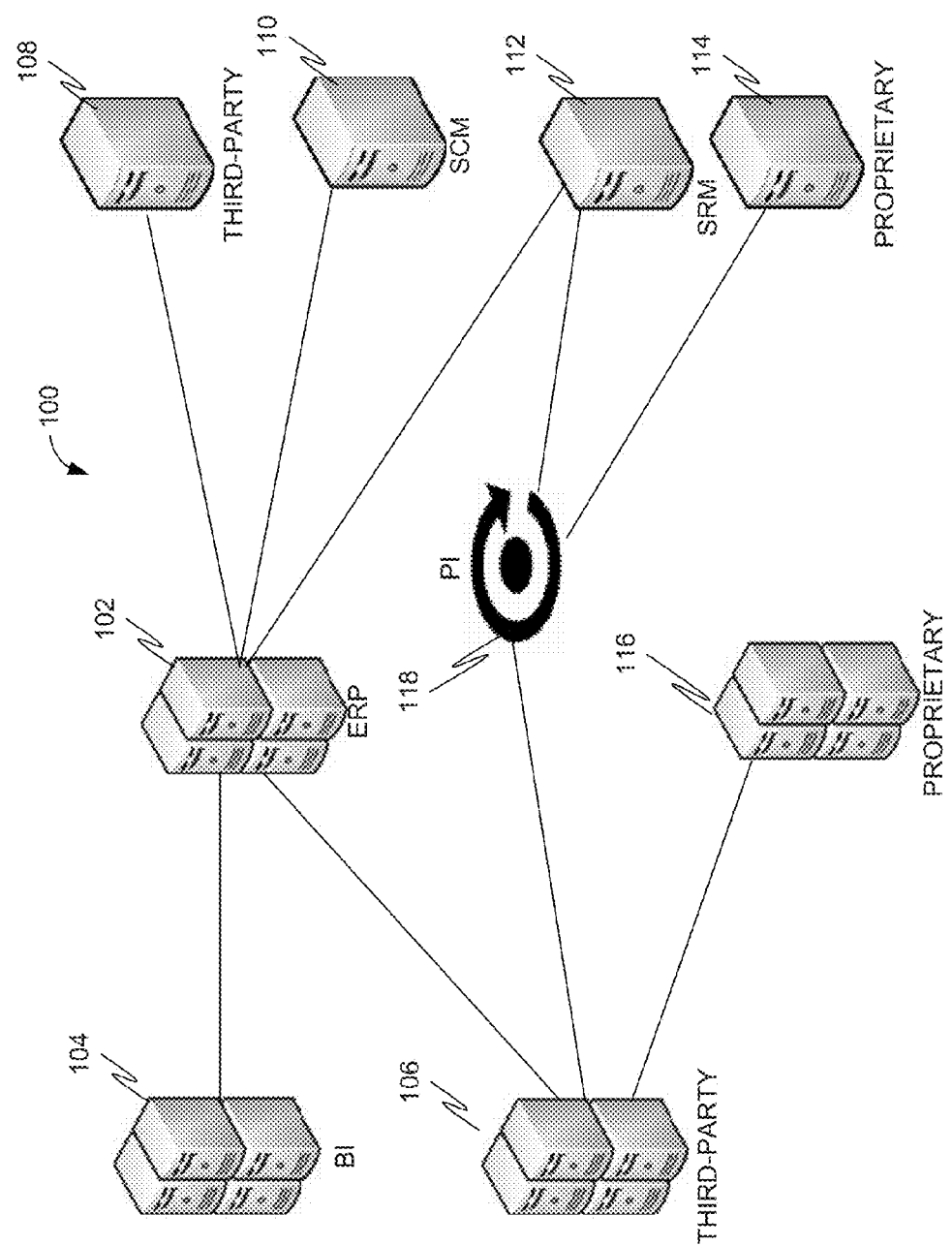
FIG. 1 is a block diagram of an application system, in accordance with an example embodiment.

FIG. 1 is a block diagram of an application system, in accordance with an example embodiment. The application system 100 comprises heterogeneous software and/or hardware components 102 to 116, which are connected to each other as shown by the solid lines in FIG. 1, and which may operate together in the application system 100 to process, for example, a business scenario. The application system 100 may comprise an enterprise resource planning (ERP) system 102. The ERP 102 may integrate internal and external management information across an entire organization, embracing different activities and/or services of an enterprise. The ERP system 102 automates the activities and/or services with an integrated computer-based application. The ERP system 102 can run on a variety of hardware and/or network configurations, typically employing a database to store its data. The ERP system 102 may be associated with (e.g., directly or indirectly connected to and/or in (networked) communication with) a business intelligence (BI) component 104, one or more third parties 106 and 108, a supply chain management (SCM) component 110, and/or a SRM component 112. The SRM component 112 and/or the SCM component 110 may further be associated with at least one proprietary service 114. Furthermore, at least one of the third parties 106 may also be associated with at least one proprietary service 116. The BI component 104 may provide historical, current, and predictive views of business processes and/or business scenarios, for example, performed on the ERP 102. Common functionality of business intelligence technologies may comprise reporting, online analytical processing, analytics, data mining, business performance management, benchmarking, text mining, and/or predictive analytics. The functionality may be used to support better decision making in the ERP system 102. The SCM component 110 may manage a network of interconnected businesses involved in the provision of product and/or service packages called for by end consumers such as the ERP system 102. The SCM component 110 may span movement and storage of raw materials, work-in-process inventory, and finished goods from point of origin to point of consumption (also referred to as a supply chain). The SRM component 112 may specify collaborations with suppliers that are vital to the success of the ERP system 102 (e.g., to maximize the potential value of those relationships). All of these systems may be integrated via a PI component 118.

Figure 2:
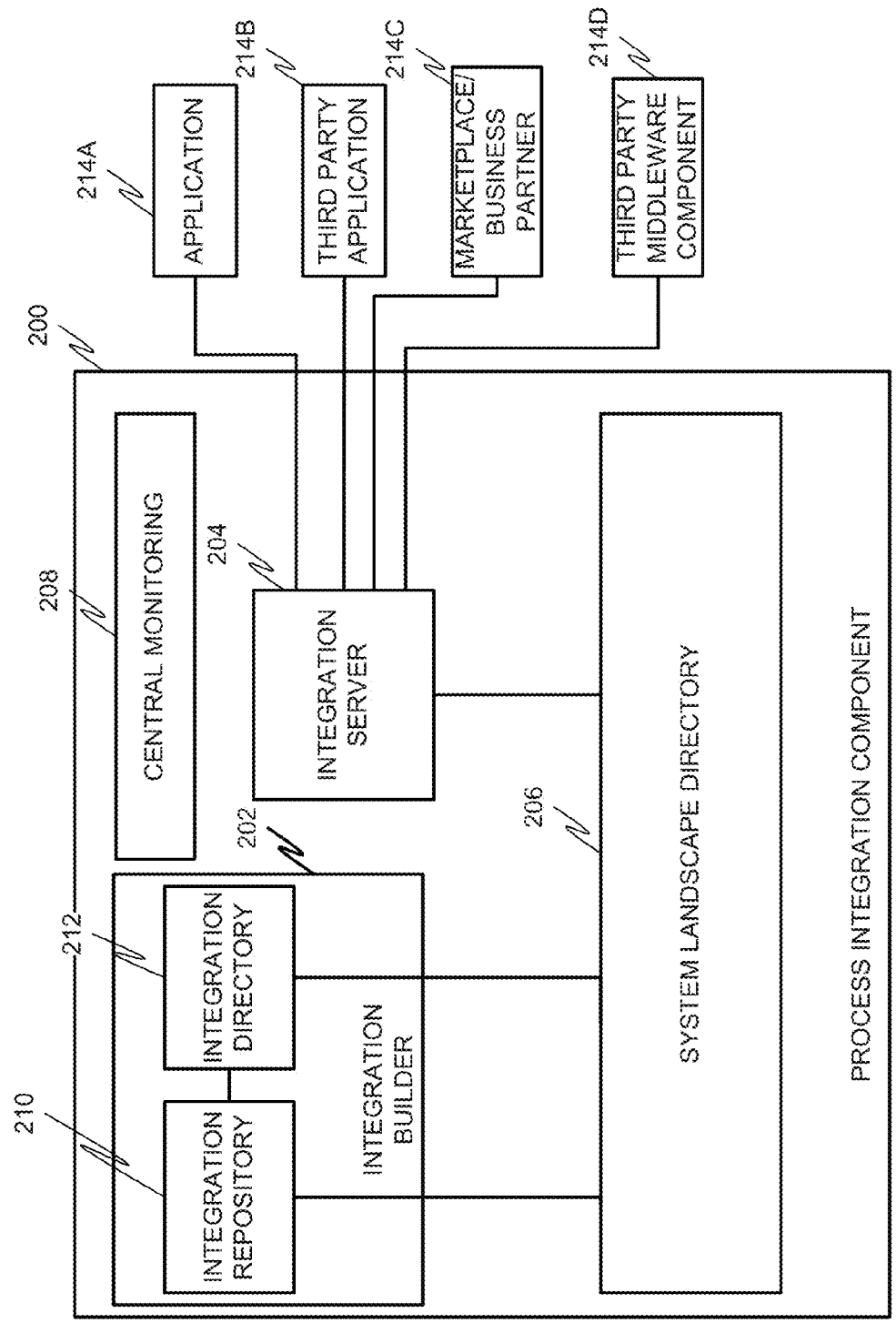
FIG. 2 is a diagram illustrating a process integration (PI) component, in accordance with an example embodiment.

FIG. 2 is a diagram illustrating a PI component, in accordance with an example embodiment. The PI component 200 contains several sub-components, including an integration builder 202, integration server 204, system landscape directory 206, and central monitoring component 208. The integration builder 202 may define objects for an integration repository 210 at design or configuration time. The integration repository 210 may maintain various objects useful to providing process integration functions, such as business scenarios, business processes, message interfaces, message types, data types, message mappings, and interface mappings. The application developer refers to these objects in defining interactive flow between applications. This interactive flow is stored in the integration directory 212. When an application is executed, the messaging flow is drawn from the integration directory 212. During execution, depending upon the specified code, the integration server 204 can act in accordance with this defined flow, and thus, for example, send messages to multiple receives, split a message into multiple messages, route a message based on content, etc.

The PI component 200 may manage the interactions between multiple entities 214a-214d. These entities may include, for example, an application 214a operated by the same entity as the PI component 200, a third party application 214b operated by a different entity than the PI component 200, a marketplace/business partner 214c, and a third party middleware component 214a.

The system landscape directory 206 is a directory of available installable software and updated data about systems already installed.

The central monitoring component 208 provides monitoring of many, if not all, aspects of the system. Some of the aspects monitored may trigger events in the integration server 204.

When the PI component 200 is not operating properly or operating at reduced efficiency, business messages may not be processed, which creates a big problem for a customer. Any downtime in a business setting could potentially cause significant monetary losses. While customers could detect the issues on their own and report them, the time delay in doing so costs money.

In an example embodiment, an automated process is provided that performs various health checks on the PI component 200 to ensure that any major problems are detected early and often. This can help the customer reduce the downtime associated with such detected problems. Automatic execution of this health check may be performed periodically. Alerts for any detected problems (or just the results of the health check) can be delivered via email, for example. Additionally, automated troubleshooting steps can be performed to resolve many common issues, thus reducing or even eliminating the need for the customer to participate in fixing any problems. Furthermore, a complete log of checks and any troubleshooting steps can be maintained, which can be used by technical support in case of future or unresolved problems.

In an example embodiment, the automated process may be embodied as a PI scenario which reads input from an Extensible Markup Language (XML file). The input may include a list of checks to be executed, and the components against which to execute these checks. The PI scenario can execute one or more application programming interfaces (APIs) to determine a health status for various components, as described by the list of checks to be executed. After execution of the API; the PI scenario can send a notification email to a system administrator if any of the health checks fail. The frequency with which the PI scenario is repeated can be set so that the PI scenario is executed automatically at a specified frequency and sends early alerts for detected issues.

Figure 3:
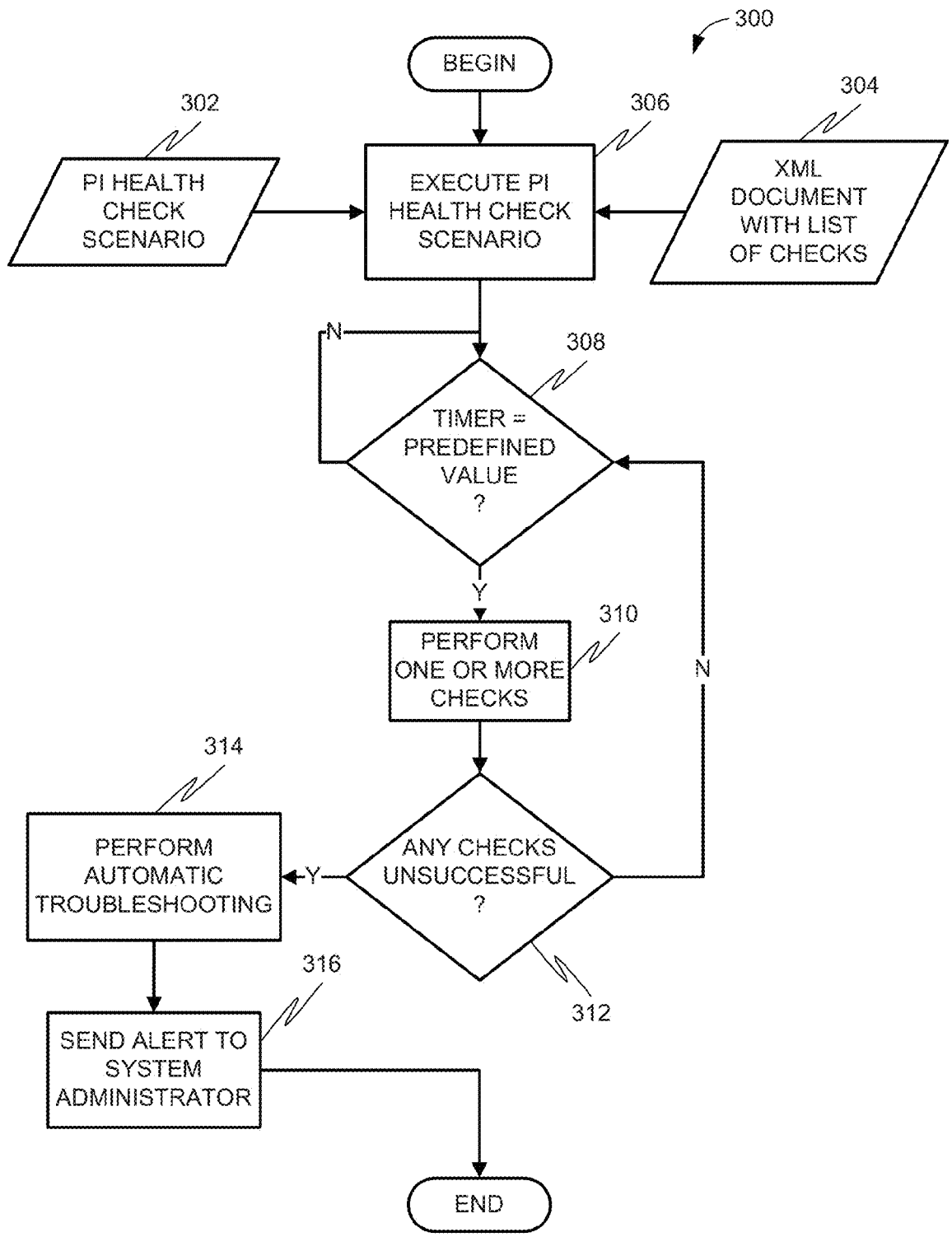
FIG. 3 is a flow diagram illustrating a method, in accordance with an example embodiment, of performing a health check on a PI component.

FIG. 3 is a flow diagram illustrating a method, in accordance with an example embodiment, of performing a health check on a PI component. Here, the method 300 utilizes a PI health check scenario 302 and a list of checks 304. At operation 306, the PI health check scenario 302 is executed. At operation 308, it is determined whether a timer is equal to a predefined value. If the timer is not equal to the predefined value, then the process loops until the timer is equal to the predefined value. Once the timer is equal to the predefined value, then at operation 310, one or more of the checks in the list of checks 304 is performed. At operation 312 it is determined if any of the checks are unsuccessful. If none of the executed checks are unsuccessful, then the process may continue to loop back to operation 308. If, however, one or more of the executed checks are unsuccessful, then at operation 314, automatic troubleshooting is performed And/or, at operation 316, an alert is sent to a system administrator.

In an example embodiment, there are four general categories of checks that can be automatically executed. The first category involves checking the system landscape directory (SLD) connection, which can include performing several tests, including determining if remote function call (RFC) connections relevant to the SLD are functioning (these RFC connections may include, for example, SAPSLDAPI and LCRSAPRFC), determining if the server-access settings in particular APIs (such as SLDAPICUST) are correct, determining if it is possible to read data from the SLD and an exchange profile, and determining if the integration server has a business system defined.

Figure 4:
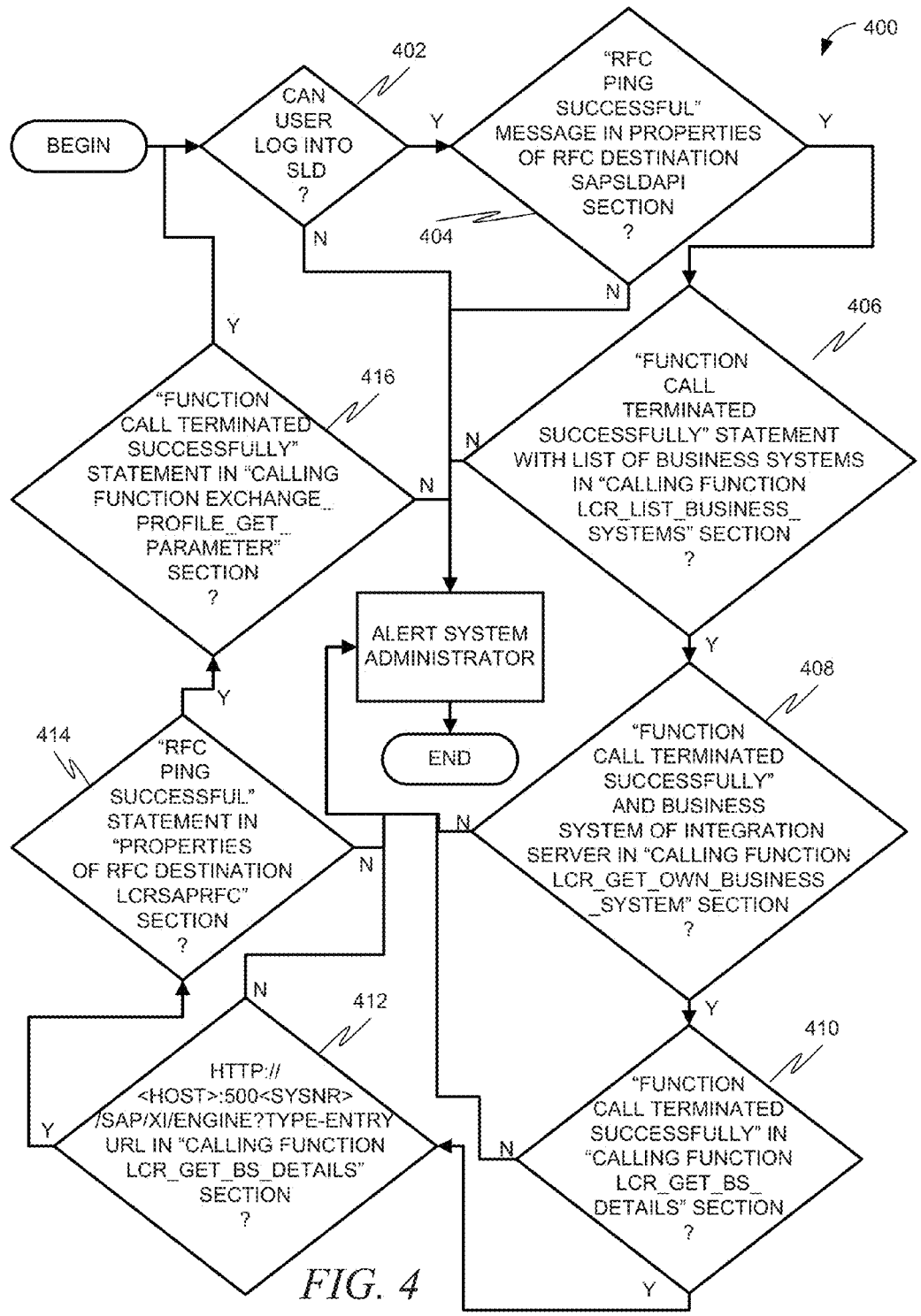
FIG. 4 is a flow diagram illustrating a method, in accordance with an example embodiment, of performing a system landscape directory (SLD) connection test.

FIG. 4 is a flow diagram illustrating a method 400, in accordance with an example embodiment, of performing an SLD connection test. This method 400 may be performed for each application server, if more than one exist. The method 400 makes reference to sections of results presented in response to the SLD connection test. The method involves examining these sections and using these sections to make certain assumptions about the connection. At operation 402, it is determined if a user can log into the SLD. This determination may include using stored login information to make a trial attempt to log in. At operation 404, it is determined if there is an "RFC Ping Successful" message in a properties of RFC destination SAPSLDAPI section. At operation 406, it is determined if there is a statement "Function call terminated successfully" along with a list of one or more business systems in a "calling function LCR_LIST_BUSINESS_SYSTEMS" section. At operation 408, it is determined if there is a statement "Function call terminated successfully" and a business system of the integration server in a "Calling function LCR_GET_OWN_BUSINESS_SYSTEM" section.

At operation 410, it is determined if there is a statement "Function call terminated successfully" in a "Calling function LCR_GET_BS_DETAILS" section. At operation 412, it is determined if there is an http://<host>:500<sysnr>/sap/xi/engine?type=entry URL in the "Calling function LCR_GET_BS_DETAILS" section.

At operation 414, it is determined if there is a statement "RFC Ping successful" in a "Properties of RFC destination LCRSAPRFC" section.

At operation 416, it is determined if there is a statement "Function call terminated successfully" in a "Calling function EXCHANGE_PROFILE_GET_PARAMETER" section.

If any of these tests fail, then, at operation 418, the system administrator may be notified, for example, via email. As will be described later, however, in some embodiments automatic troubleshooting may take place.

Of course, these descriptions of statements and sections are merely illustrative and are not intended to be limiting. In other example embodiments, similar, but not identical, statements located in similar, but not identical, sections may be examined.

The second general category of checks involves checking message processing in the PI system, which can include performing tests for receiving exchange infrastructure (XI) messages from an XI monitor (e.g., SXI_MONI) and checking whether XI messages are being processed in the system. In this check, messages that have already been processed are extracted, and the system can then check the processing status of the most recent message to determine whether it has reached the integration engine.

Figure 5:
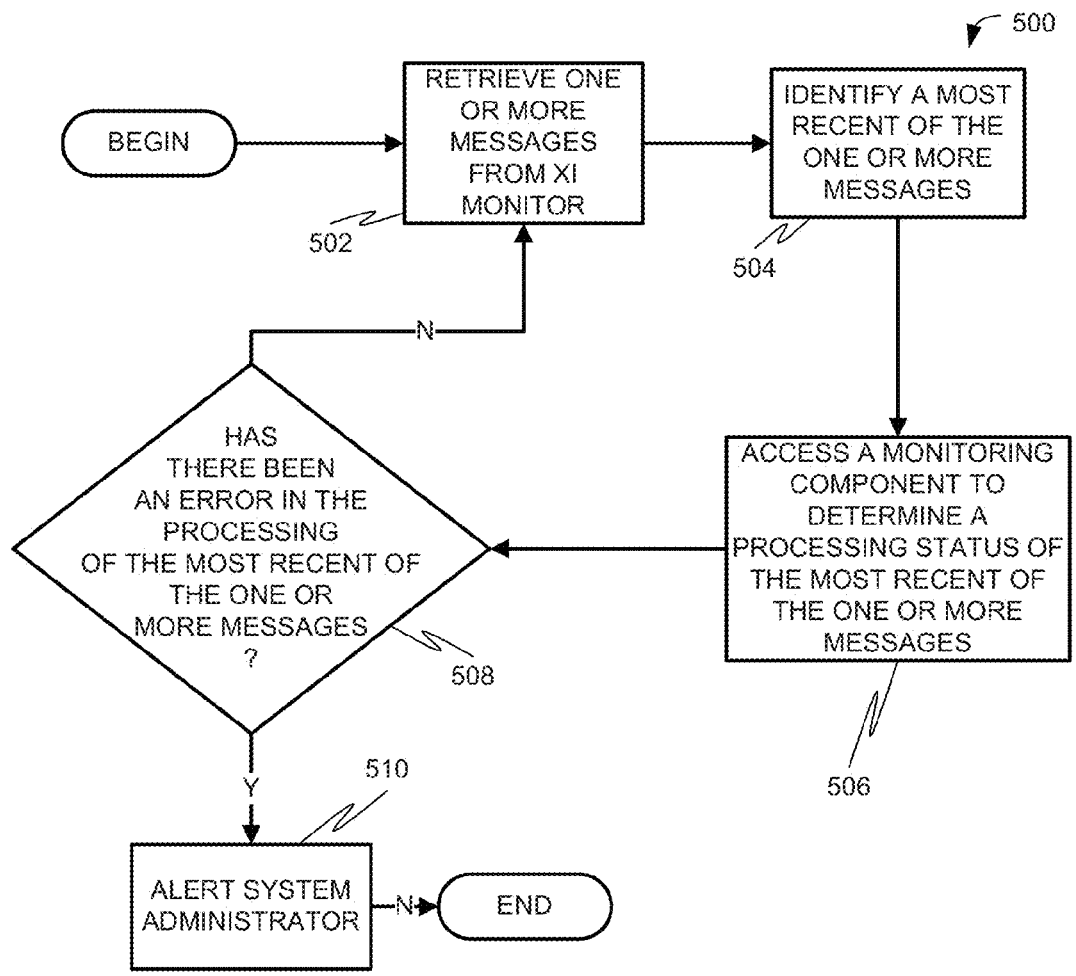
FIG. 5 is a flow diagram illustrating a method, in accordance with an example embodiment, of checking message processing in a PI system.

FIG. 5 is a flow diagram illustrating a method 500, in accordance with an example embodiment, of checking message processing in a PI system. At operation 502, one or more messages are retrieved from an XI monitor. At operation 504, a most recent message of the one or more retrieved messages is identified. At operation 506, a message monitoring component is accessed to determine a processing status of the most recent of the one or more messages. At operation 508, it is determined if an error occurred in the processing of the most recent message of the retrieved one or more messages. This determination can be made by examining the message status. For example, the message status may be listed as a success. If not, it can be assumed that an error has occurred. If it is assumed an error has occurred, then, at operation 510, the system administrator may be alerted. If no error is assumed or detected, the process may loop back to operation 502 and repeated when a periodic check is next requested.

The third general category of checks may involve basic technical checks for the PI system, which can include performing several tests, including checking whether an internet communication management (ICM) is active in the system, checking whether a web service runtime is operating properly, checking whether a basic configuration for process agent framework is available, and checking whether an XI cache update is working.

Figure 6:
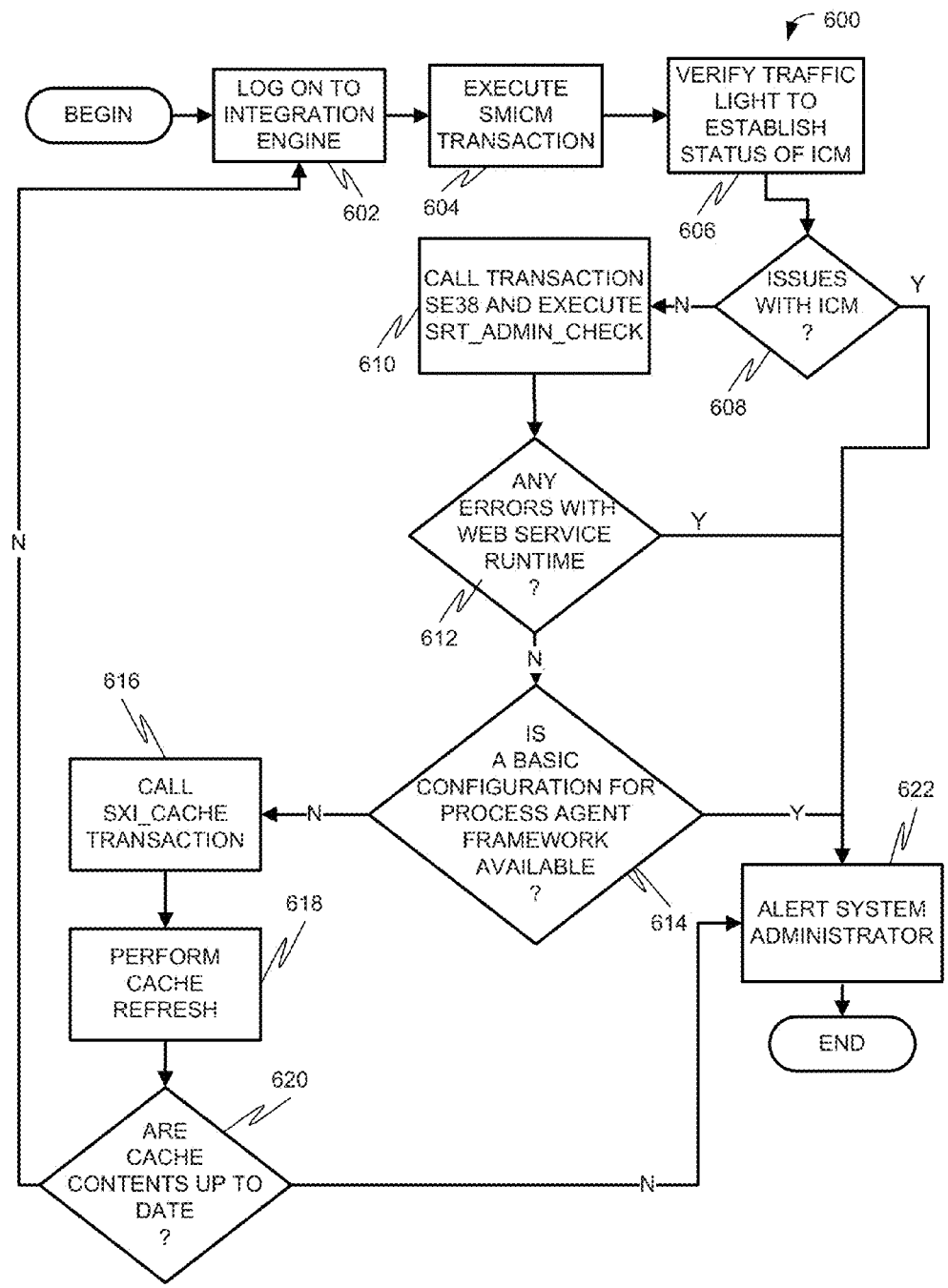
FIG. 6 is a flow diagram illustrating a method, in accordance with an example embodiment, of performing basic technical checks for a PI system.

FIG. 6 is a flow diagram illustrating a method 600, in accordance with an example embodiment, for performing basic technical checks for a PI system. At operation 602, the system may log onto the integration engine. At operation 604, the system may execute a Supply Chain Manager Internet Communication Manager (SMICM) transaction. At operation 606, the system may verify a traffic light to establish the status of the ICM. A traffic light is a software function that monitors a status and automatically indicates the status to another system or user. At operation 608, it is determined whether the status of the ICM is correct.

At operation 610, the system may call transaction se38 and execute the program SRT_ADMIN_CHECK. Transaction se38 calls an Advanced Business Application Programming (ABAP) editor and ASRT_ADMIN_CHECK runs a program for checking technical settings and returns a report. At operation 612, it may be determined if there are any errors with the web service runtime based on the results of the execution in operation 610.

At operation 614, it is determined whether a basic configuration for a process agent framework is available.

At operation 616, an SXI_CACHE transaction is called. SXI_CACHE shows the content of the cache. A cache refresh is then called at operation 618. At operation 620, it is determined if cache contents are up-to-date. If the contents of the cache are not up-to-date, then at operation 622 a system administrator may be alerted. If the contents of the cache are up-to-date, then the process may periodically repeat to operation 602.

Figure 7:
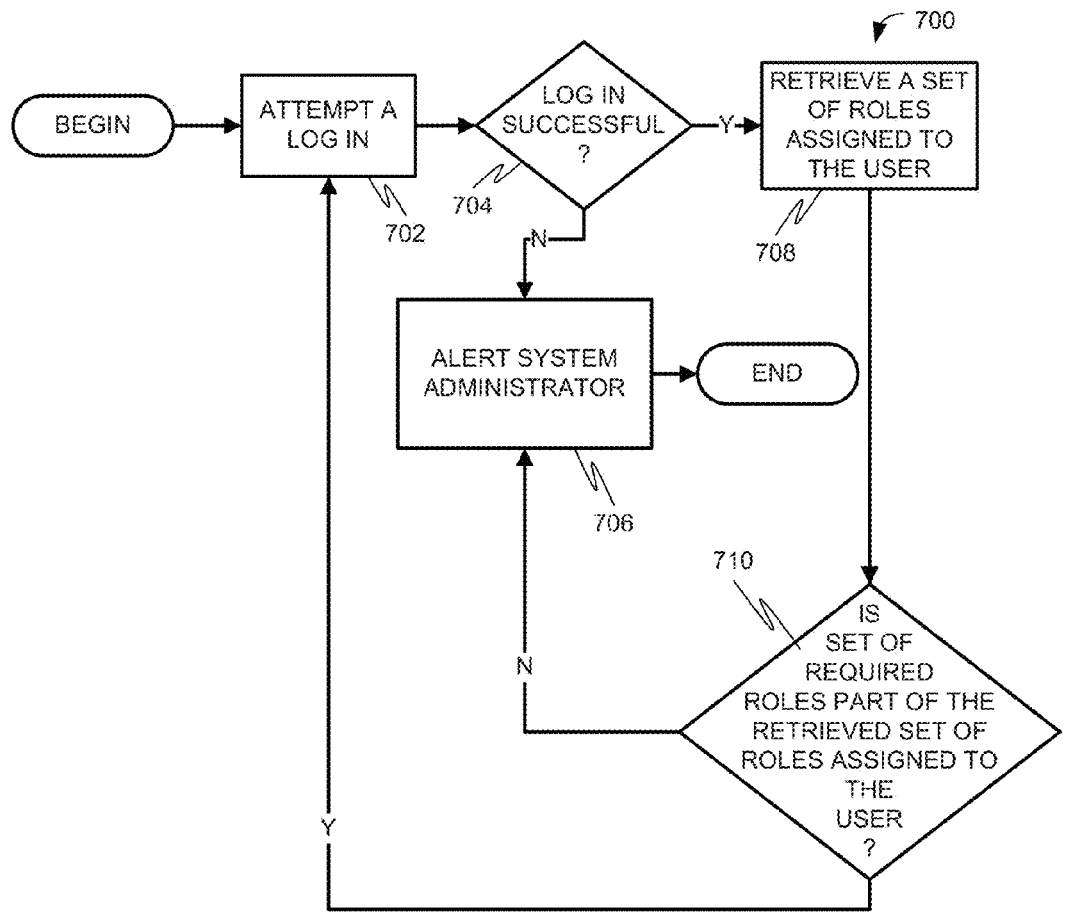
FIG. 7 is a flow diagram illustrating a method, in accordance with an example embodiment, of checking technical aspects of a user.

The fourth general category of checks involves checking technical aspects of a user, which may include performing tests for checking whether a user is able to log into a system, and whether a set of roles is assigned to the user. FIG. 7 is a flow diagram illustrating a method 700, in accordance with an example embodiment, for checking technical aspects of a user. At operation 702, a login is attempted. At operation 704, it is determined if the login attempt is successful. If the login attempt is not successful, then, at operation 706, the system administrator may be alerted. If the login attempt is successful, then at operation 708, a set of roles assigned to the user may be retrieved (such as for example by calling a function module BAPI_USER_GET_DETAIL). At operation 710, it is determined if a specific set of roles is part of the retrieved set of roles assigned to the user. If the specific set of roles is not part of the retrieved set of roles assigned to the user, then the process proceeds to operation 706. If the specific set of roles is part of the retrieved set of roles assigned to the user, then the process loops back to operation 702 and is repeated when a periodic check is next requested.

It should be noted that in the above flow diagrams, a step of alerting a system administrator is performed if any of the checks detect a problem. In some embodiments, however, either in addition to or in lieu of alerting a system administrator, automatic troubleshooting steps may be performed. The following are example automatic troubleshooting processes that can be performed for various checks.

Figure 8:
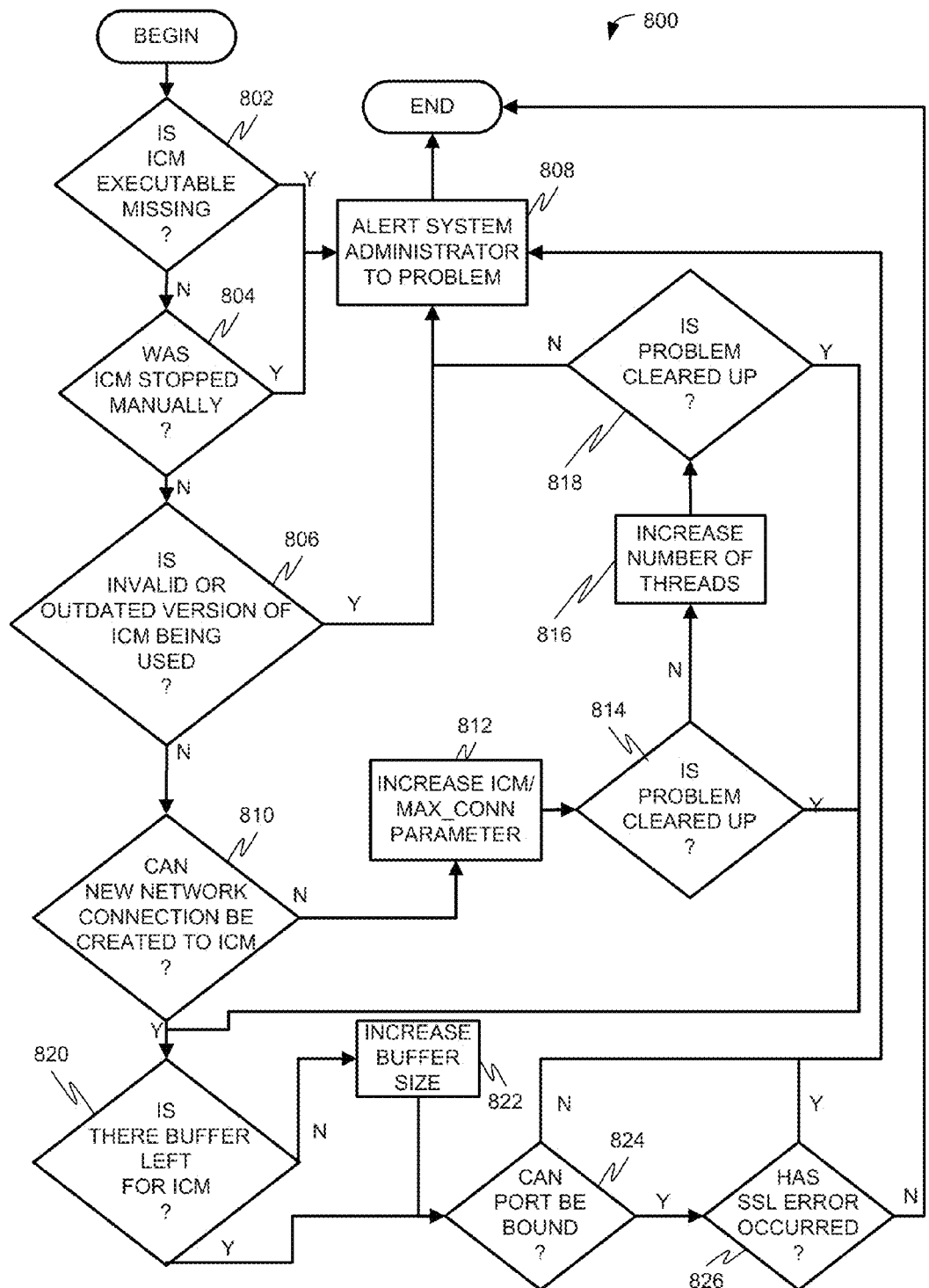
FIG. 8 is a flow diagram illustrating a method, in accordance with an example embodiment, of automatically troubleshooting a problem with the internet communication management (ICM).

FIG. 8 is a flow diagram illustrating a method 800, in accordance with an example embodiment, for automatically troubleshooting a problem with the ICM. At operation 802, it is determined whether an ICM executable is missing. At operation 804, it is determined whether the ICM was stopped manually. At operation 806, it is determined whether an invalid (or outdated) version of the ICM is being used by, for example, comparing the version of the ICM with a predefined version number. If any of these are determined to be the issue, then, at operation 808, a system administrator may be alerted to the problem. If not, then, at operation 810, it is determined if a new network connection to the ICM can be created. This may be determined by, for example, examining the initial screen of an ICM monitor and determining if values for peak and maximum within a connections-used area are the same, which means that all the connections were used up at a point in time. If that is the case, then, at operation 812, the parameter icm/max_conn may be increased. This increases the maximum amount of connections allowed for the ICM. At operation 814, it may be determined if the problem is resolved based on the occurrence of operation 812. If not, then the problem may be that the ICM queue for requests has overflowed. Thus, at operation 816 the number of threads is increased, which should solve the problem if there were too few threads configured. At operation 818 it is determined if the occurrence of operation 816 resolves the problem. If not, then, at operation 808, a system administrator may be alerted to check any hanging threads to determine the issue.

At operation 820, it is determined if the ICM has any remaining buffer. This may be determined by checking whether all message passing interface (MPI) buffers have been used, perhaps by checking whether a parameter peak buffer usage reaches a parameter total #Mpi buffer. If there is no buffer remaining, then, at operation 822, the buffer size may be increased.

At operation 824, it is determined if a port can be found. A port is found if a port has been defined for this connection. If no port can be found, then the method 800 proceeds to operation 808. If a port can be found, then the method 800 proceeds to operation 826. At operation 826 it may be determined if a Secure Sockets Layer (SSL error) has occurred. If a port cannot be found or an SSL error has occurred, then the process may alert the system administrator at 808. If it is determined at operation 826 that no SSL error has occurred, then the method 800 ends.

Figure 9:
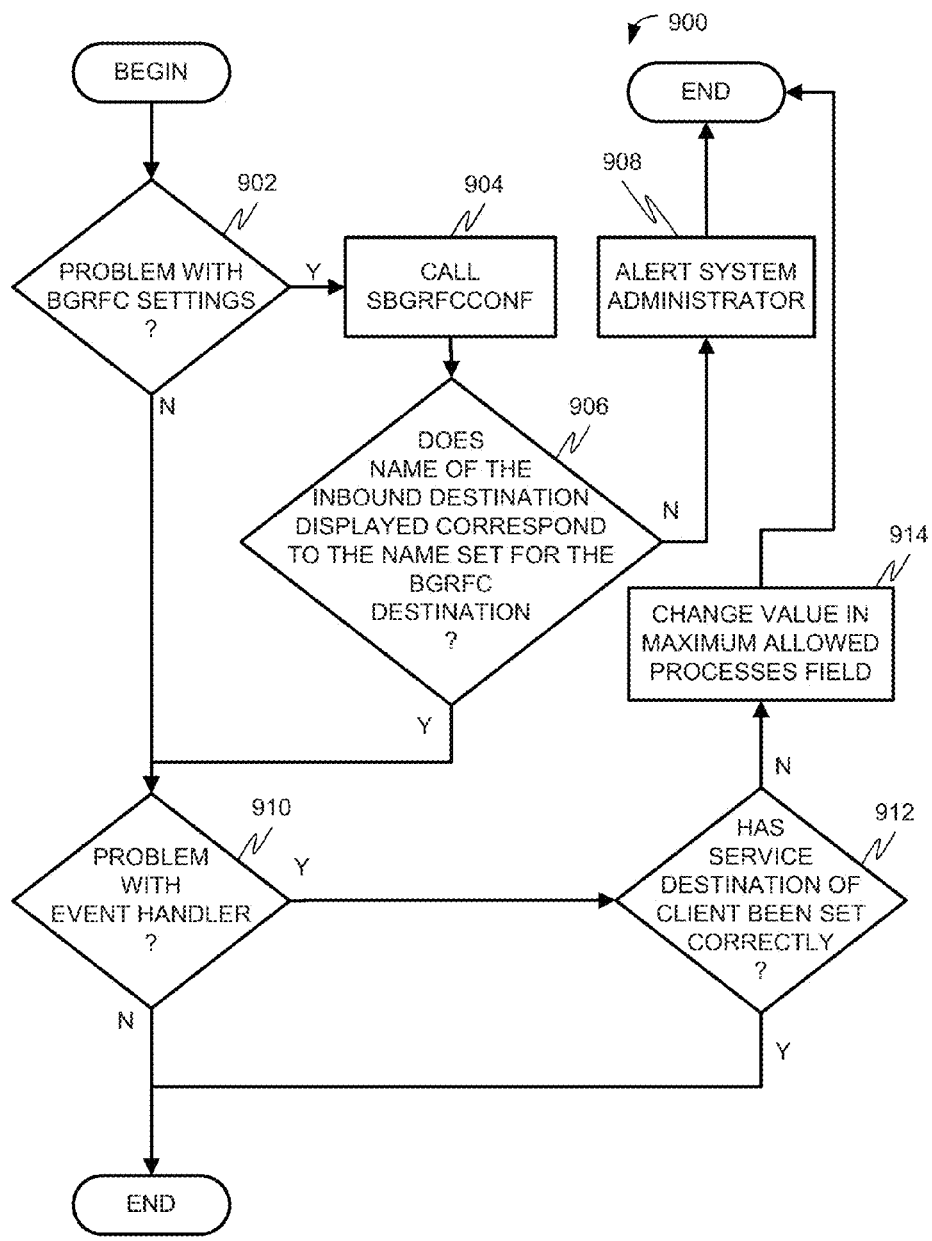
FIG. 9 is a flow diagram illustrating a method, in accordance with an example embodiment, of automatically troubleshooting a problem with a web service runtime.

FIG. 9 is a flow diagram illustrating a method 900, in accordance with an example embodiment, for automatically troubleshooting a problem with a web service runtime. In many cases, the result of the check will not only include an indication that the check has failed or passed, but also include an error message identifying the area of failure, in the case of a failure. The subsequent actions taken can depend on the error message. At operation 902, it is determined if the error message indicates a problem with background remote function call (bgRFC) settings. bgRFC allows applications to record data that is later received by a called application. The name of the bgRFC destination can be maintained in two different areas. One is in the general configuration of the bgRFC and the other is in the configuration of the WS runtime. It is possible that two different values were set for the bgRFC destination, which would result in problems when scheduling sequences. If such an error occurs, then, at operation 904, transaction SBGRFCCONF may be called. The transaction SBGRFCCONF allows for basic configuration tasks to be performed on bgRFC settings. At operation 906, it is determined if the name of the inbound destination displayed there corresponds to the name set for the bgRFC destination. If not, then at operation 908 a system administrator is alerted.

At operation 910, it is determined if the error message indicates a problem with the event handler. If the event handler is active, events that occur in connection with web services messaging are processed. Cancelling sequences with a sequence monitor is based on the event handler operating properly. If the event handler is not operating properly, then sequences may be cancelled. If it is determined at operation 910 that there is a problem with the event handler, the method 900 proceeds to operation 912. At operation 912, it is determined whether the service destination of a client has been set correctly. This may be determined by, for example, calling a report (e.g., RSEHCONFIG) and checking to see if the value 0 is in the maximum allowed processes field. If it is determined that the destination has not been set correctly, method 900 proceeds to operation 914, where this value can be changed. After operation 914, method 900 ends.

Figure 10:
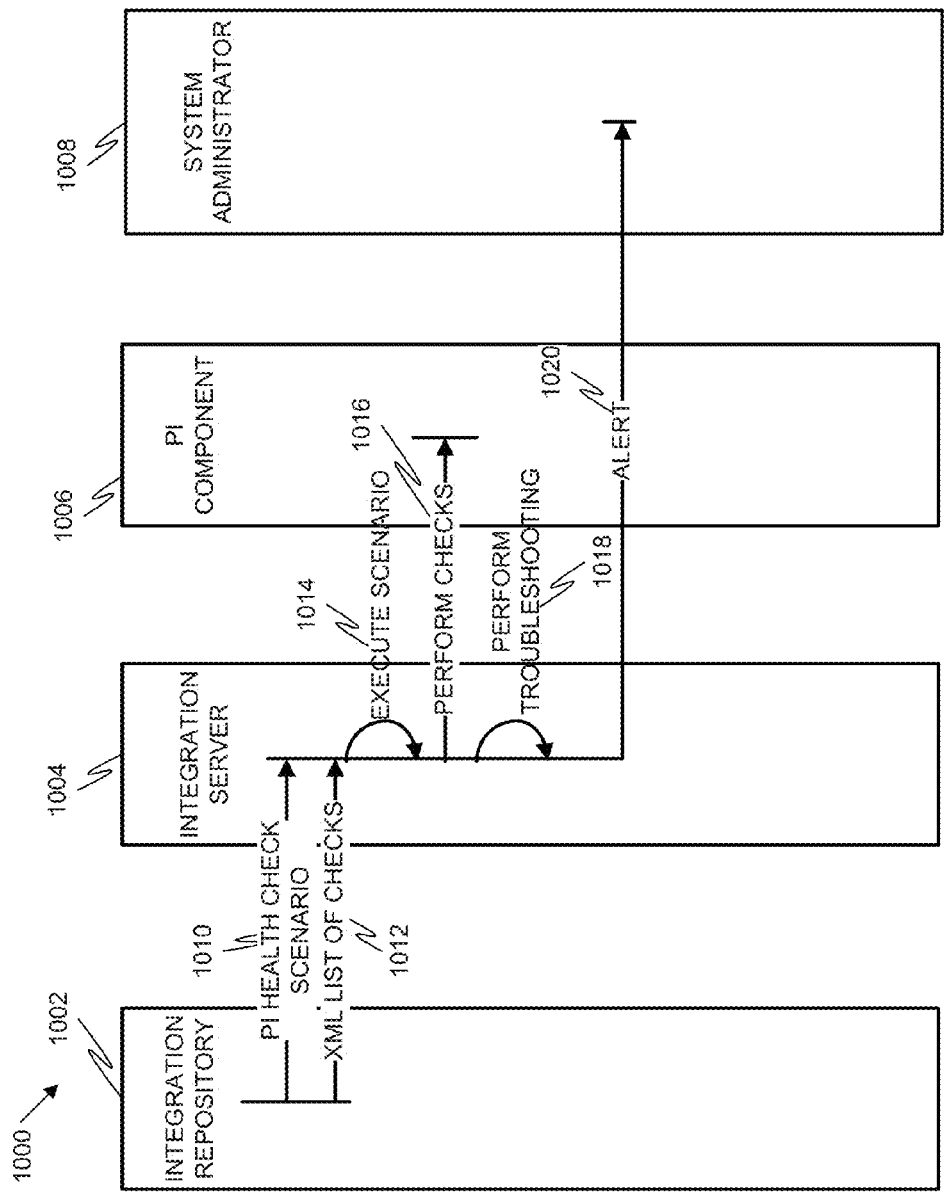
FIG. 10 is an interaction diagram illustrating a method, in accordance with an example embodiment, of performing a PI health check.

FIG. 10 is an interaction diagram illustrating a method 1000, in accordance with an example embodiment, of performing a PI health check. The method 1000 may utilize various components and entities, including integration repository 1002, integration server 1004, PI component 1006, and system administrator 1008. At operation 1010, the integration repository 1002 sends a PI health check scenario to the integration server 1004. At operation 1012, the integration repository 1002 sends an XML list of checks to the integration server 1004. At operation 1014, the integration server 1004 executes the health check scenario, which performs the checks at operation 1016 on the PI component 1006. Once errors are discovered, at operation 1018, troubleshooting may be performed. At operation 1020, the PI component 1006 may alert the system administrator 1008 of the issue.

Figure 11:
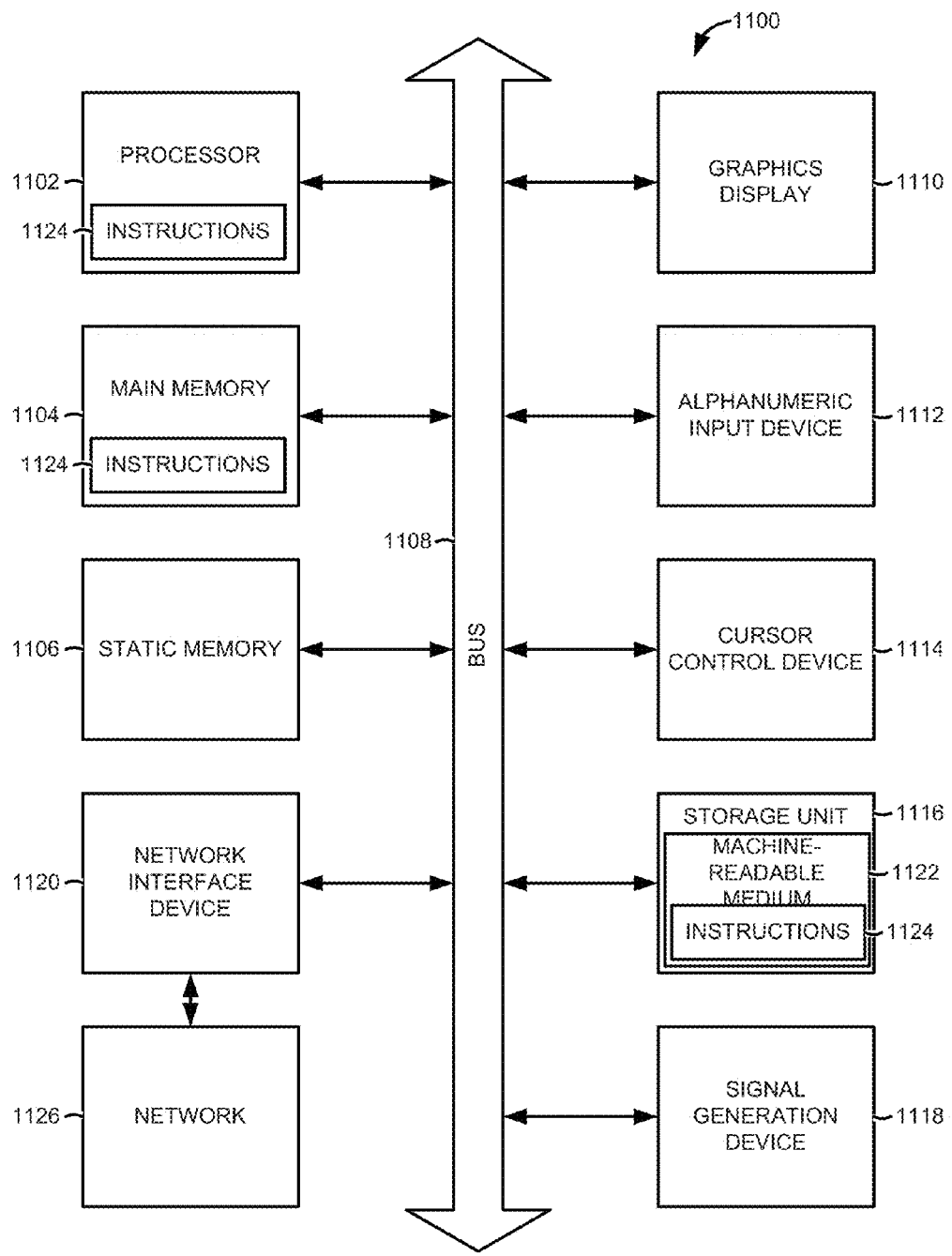
FIG. 11 is a block diagram of a computer processing system at a server system, within which a set of instructions may be executed for causing the computer to perform any one or more of the methodologies discussed herein.

FIG. 11 is a block diagram of a computer processing system 1100 at a server system, within which a set of instructions may be executed for causing the computer to perform any one or more of the methodologies discussed herein.

Embodiments may also, for example, be deployed by Software-as-a-Service (SaaS), application service provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1100 includes processor 1102 (e.g., a central processing unit (CPU), a graphics processing unit (GPU) or both), main memory 1104 and static memory 1106, which communicate with each other via bus 1108. The processing system 1100 may further include graphics display unit 1110 (e.g., a plasma display, a liquid crystal display (LCD) or a cathode ray tube (CRT)). The processing system 1100 also includes alphanumeric input device 1112 (e.g., a keyboard), a cursor control device 1114 (e.g., a mouse, touch screen, or the like), a storage unit 1116, a signal generation device 1118 (e.g., a speaker), and a network interface device 1120.

The storage unit 1116 includes machine-readable medium 1122 on which is stored one or more sets of instructions 1124 and data structures (e.g., software) embodying or utilized by any one or more of the methodologies or functions described herein. The instructions 1124 may also reside, completely or at least partially, within the main memory 1104 and/or within the processor 1102 during execution thereof by the processing system 1100, the main memory 1104 and the processor 1102 also constituting machine-readable, tangible media.

The instructions 1124 may further be transmitted or received over network 1126 via a network interface device 1120 utilizing any one of a number of well-known transfer protocols (e.g., HTTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "machine readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "machine-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of performing a health check on an integration server within a process integration (PI) component, the method comprising:
    loading a PI health check scenario into the integration server within the PI component, the PI health check scenario defining functions including a reference to a list of checks to be performed on the integration server to test the integration server within the process integration component, the PI component managing interactions between at least one application operated by the same entity as the PI component and at least one third party application operated by an entity other than the entity operating the PI component;
    executing the PI health check scenario using the integration server within the PI component, causing one or more checks in the list of checks to be performed at a predetermined frequency, the one or more checks comprising checking a connection from either an integration builder or an integration server to a system landscape directory; and
    automatically determining if one or more of the one or more checks fail.

2. The method of claim 1, wherein the one or more checks include performing basic technical checks on the integration server within the PI component.

3. The method of claim 2, wherein the basic technical checks include checking whether an Internet Connection Management (ICM) is active.

4. The method of claim 2, wherein the basic technical checks include checking whether a web service runtime running on the integration server within the PI component is operating properly.

5. The method of claim 2, wherein the basic technical checks include checking whether a basic configuration for a process agent framework running on the integration server within the PI component is available.

6. The method of claim 2, wherein the basic technical checks include checking whether an exchange infrastructure cache update running on the integration server within the PI component is operating properly.

7. The method of claim 1, wherein the one or more checks include checking whether a user is able to log into the integration server within the PI component.

8. The method of claim 7, wherein the one or more checks include checking whether a set of roles is assigned to the user by the integration server within the PI component.

9. A process integration (PI) component, the PI component comprising:
    an integration builder including:
    an integration repository, and an integration directory;
    a central monitoring component;
    a system landscape directory; and
    an integration server configured to execute a PI health check scenario having a reference to an extensible markup language (XML) document with a list of checks, causing retrieval of the XML document and one or more checks in the list of checks to be performed at a predetermined frequency, the list of checks testing aspects of the integration server, the one or more checks comprising checking a connection from either an integration builder or the integration server to a system landscape directory, and
    automatically to determine if one or more of the one or more checks fail; the PI component managing interactions between at least one application operated by the same entity as the PI component and at least one third party application operated by an entity other than the entity operating the PI component.

10. The process integration component of claim 9, coupled to one or more process components in an Enterprise Resource Planning (ERP) system.

11. The process integration component of claim 10, wherein the one or more process components include an application distributed by a party that distributes the process integration component.

12. The process integration component of claim 10, wherein the one or more process components include a third party application.

13. The process integration component of claim 10, wherein the one or more process components include a marketplace or business partner application.

14. The process integration component of claim 10, wherein the one or more process components include a third party middleware component.

15. A non-transitory computer-readable storage medium comprising instructions that, when executed by at least one processor of a machine, cause the machine to perform operations of performing a health check on a process integration (PI) component, the operations further comprising:
    loading a PI health check scenario into the integration server within the P component, the PI health check scenario defining functions including a reference to a list of checks to be performed on the integration server to test the integration server within the process integration component, the PI component managing interactions between at least one application operated by the same entity as the PI component and at least one third party application operated by an entity other than the entity operating the PI component;

using the reference to retrieve an extensible markup language XML document containing the list of checks;

executing the PI health check scenario using the integration server within the PI component, causing one or more checks in the list of checks in the XML document to be performed at a predetermined frequency, the one or more checks comprising checking a connection from either an integration builder or an integration server to a system landscape directory; and automatically determining if one or more of the one or more checks fail.

16. The non-transitory computer-readable storage medium of claim 15, wherein the one or more checks include performing basic technical checks on the integration server within the PI component.

17. The non-transitory computer-readable storage medium of claim 16, wherein the basic technical checks include checking whether an Internet Connection Management (ICM) is active.

18. The non-transitory computer-readable storage medium of claim 16, wherein the basic technical checks include checking whether a web service runtime running on the integration server within the PI component is operating properly.

* * * * *